US006925176B2

(12) United States Patent
Myllylä et al.

(10) Patent No.: US 6,925,176 B2
(45) Date of Patent: Aug. 2, 2005

(54) METHOD FOR ENHANCING THE ACOUSTIC ECHO CANCELLATION SYSTEM USING RESIDUAL ECHO FILTER

(75) Inventors: Ville Myllylä, Tampere (FI); Gerald Enzner, Neuhof/Zenn (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/871,606

(22) Filed: Jun. 17, 2004

(65) Prior Publication Data

US 2005/0063536 A1 Mar. 24, 2005

Related U.S. Application Data

(60) Provisional application No. 60/483,265, filed on Jun. 27, 2003.

(51) Int. Cl.[7] .............................................. H04M 1/00
(52) U.S. Cl. .............................. 379/406.05; 379/406.06
(58) Field of Search ....................... 379/406.01, 406.02, 379/406.03, 406.04, 406.05, 406.06, 406.07, 406.08

(56) References Cited

U.S. PATENT DOCUMENTS 6,507,653 B1 * 1/2003 Romesburg ............ 379/406.05
2003/0219113 A1 * 11/2003 Bershad et al. ........ 379/406.01

OTHER PUBLICATIONS

C. Breining et al, Acoustic Echo Control—An Application of Very High–Order Adaptive Filters, IEEE Signal Processing Mag, vol. 16, No. 4, pp. 42–69, Jul. 1999.
S. Haykin, Frequency–Domain and Subband Adaptive Filters, In: Adaptive Filter Theory, Prentice Hall, 4th ed., 2002, Chapters 7.1 and 7.2.
E. Ferrara, Frequency–domain adaptive filtering, In: C. Cowan et al, Adaptive Filters, Prentice Hall, 1985, Chapter 6.
B. Nitsch, A frequency–selective stepfactor control for an adaptive filter algorithm working in the frequency domain, Signal processing, vol. 80, pp. 1733–1746, 2000.
A. Mader et al, Step–Size Control for Acoustic Echo Cancellation Filters—an Overview, Signal Processing, vol. 80, No. 9, pp. 1697–1719, Sep. 2000.
E. Hansler et al, hands–free telephones—joint control of echo cancellation and postfiltering, Signal Processing, vol. 80, No. 11, pp. 2295–2305, 2000.
G. Enzner et al, Partitioned Residual Echo Power Estimation for Frequency–Domain Acoustic Echo Cancellation, etc., Eur. Trans. on Telecomm, vol. 13, No. 2 pp 103–114, Mar. 2002.
G. Glentis et al, Efficient Least Squares Adaptive Algorithms for FIR Transversal Filtering: a unified view, IEEE Signal processing, pp. 13–41, Jul. 1999.

* cited by examiner

Primary Examiner—Jefferey F. Harold

(57) ABSTRACT

This invention discloses an improvement to a digital Acoustic Echo Control (AEC) in hands-free telephones. It describes an additional adaptive filter referred to as a residual echo filter, which is placed after the usual echo canceller and it is used to efficiently and accurately estimate a residual echo signal b(i) and a system coupling factor β(i), which can be utilized to establish an efficient control for the AEC system and construct the appropriate filters. The invention also describes a control block means performing a joint operation control of the echo canceller, residual echo suppressor and residual echo filter for achieving more consistent echo cancellation results and enhancing output signal quality.

28 Claims, 3 Drawing Sheets

METHOD FOR ENHANCING THE ACOUSTIC ECHO CANCELLATION SYSTEM USING RESIDUAL ECHO FILTER

CROSS-REFERENCE TO RELATED APPLICATION

This application claims priority from U.S. Provisional Patent Application Ser. No. 60/483,265, filed Jun. 27, 2003. This application discloses subject matter which is also disclosed and which may be claimed in copending, co-owned U.S. patent application Ser. No. 10/608,785, filed Jun. 27, 2003.

FIELD OF THE INVENTION

This invention generally relates to a digital Acoustic Echo Control (AEC) in telephones and more specifically, to introducing an additional residual echo filter and modifying a control block means for achieving more consistent echo cancellation results and enhancing output signal quality.

BACKGROUND OF THE INVENTION

The invention is related to a digital Acoustic Echo Control (AEC) unit of telephones. The purpose of the AEC is to prevent the far-end speaker's speech circulating back as an echo after coming out from the near-end phone user's loudspeaker and partly picked up by the phone's microphone. A general concept is illustrated in FIG. 1 where "i" denotes the sampling time index. Advanced AEC units contain an echo canceller module 21, generally consisting of an echo canceller 10 with a gradient adaptation means 12 and an adder 30, and a residual echo suppressor (sometimes referred to as a postfilter) 14 for residual echo suppression.

The need for an AEC unit in the hands-free telephones basically arises from an acoustic echo path with an impulse response $g(i)$ from a local loudspeaker 16 to a local microphone 18. The objective of the echo canceller 10 with an impulse response $c(i)$ is to find a replica of the echo path in order to compensate for an echo signal $d(i)$ 22 of a voice signal $x(i)$ 20 received by a loudspeaker 16 that provides an acoustic output signal in response to the voice signal $x(i)$ 20, thus generating in the microphone 18 the echo signal $d(i)$ 22 which is one of the components of a microphone signal $y(i)=d(i)+s(i)+n(i)$ 28, where $y(i)$ is a microphone speech signal and $n(i)$ is a background noise signal. As the system identification process is always performed in the presence of observation noise (local speech plus background noise), $s(i)+n(i)$, the objective of $c(i)=g(i)$ cannot be reached exactly. The echo canceller 10 generates an estimate echo signal $d'(i)$ 32 which is negatively added to the microphone signal 18 by the adder 30 which generates an echo reduced microphone signal $e(i)$ 34 containing the partially compensated echo signal. The echo reduced microphone signal $e(i)$ 34 is further provided to the gradient adaptation means 12 and to the residual echo suppressor 14. The gradient adaptation means 12 further provides a control signal 15 to the echo canceller 10 by determining a gradient of the controlled signal based on predetermined criteria using the voice signal $x(i)$ 20 and the echo reduced microphone signal $e(i)$ 34 as input signals. The purpose of the residual echo suppressor 14 is further reducing of residual echo components of the echo reduced microphone signal $e(i)$ 34. The resulting output system signal $s'(i)+n'(i)$ 36 after residual echo suppression by the residual echo suppressor 14 is then transmitted to the far speaker.

The basic principles of how to generate and control the echo canceller 10 and the residual echo suppressor 14 are well known. However, there are some problems involved in controlling them efficiently in a most optimal way. The key variable in the whole control issue is the residual echo, $b(i)=d(i)-d'(i)$ which, unfortunately, cannot be directly determined since it is inherently embedded in the echo reduced microphone signal $e(i)=b(i)+s(i)+n(i)$ 34.

The echo canceller module 21 of FIG. 1 often provides an insufficient estimate of the echo signal $d(i)$ 22. The residual echo suppressor 14, in the sending path of the telephone, performs residual echo suppression, but in many solutions this is achieved at the cost of distortions (attenuations) of the useful signal $s(i)+n(i)$. This is because the echo canceller 10 does the echo reduction in phase and magnitude, whereas, the residual echo suppressor 14 does it only in magnitude. In an alternative solution, the echo canceller module 21 can be used alone without a residual echo suppressor 14. This approach does not introduce noticeable signal distortions, but normally requires a very sophisticated control mechanism for the echo canceller. A more simple and effective approach is needed.

SUMMARY OF THE INVENTION

The object of the present invention is to provide a novel method for achieving more consistent echo cancellation results and enhancing output signal quality by introducing an additional residual echo filter and modifying a control block.

According to a first aspect of the present invention, an echo cancellation system comprises: a microphone, responsive to a resulting echo signal from a loudspeaker that provides an acoustic output in response to a speech signal, for providing an echo signal which is a component of a microphone signal; and a control block means, responsive to the speech signal, to an echo reduced microphone signal and to a further echo reduced microphone signal, for providing a first control signal to an echo canceller, a second control signal to a residual echo suppressor and a third control signal to a residual echo filter; wherein said control signals are provided for optimizing cancellation of the echo signal According further to the first aspect of the invention, the first control signal may be a transfer function signal provided to the echo canceller, wherein said transfer function signal weights the voice signal.

Further according to the first aspect of the invention, the second control signal may be a further transfer function signal provided to the residual echo suppressor, said further transfer function signal weights an echo reduced microphone signal.

Still further according to the first aspect of the invention, the third control signal may be a residual transfer function signal provided to the residual echo filter, said residual transfer function signal weights the voice signal.

According further to the first aspect of the invention, the echo cancellation system may further comprise the residual echo filter, responsive to the speech signal and to the third control signal, for providing a further estimate echo signal to a further adder.

According still further to the first aspect of the invention, the echo cancellation system may further comprise the residual echo suppressor, responsive to an echo reduced microphone signal and to the second control signal, for providing an output system signal.

According still yet further to the first aspect of the invention, the echo cancellation system may further comprise the echo canceller, responsive to the voice signal and to the first control signal, for providing an estimate echo signal to an adder. Further, the echo cancellation system may further comprise the residual echo filter, responsive to the speech signal and to the third control signal, for providing a further estimate echo signal to a further adder. Still further, the echo cancellation may further comprise the residual echo suppressor, responsive to the echo reduced microphone signal and to the second control signal, for providing an output system signal.

According further still to the first aspect of the invention, the echo cancellation system may further comprise an adder, responsive to a microphone signal and to an estimate echo signal, for providing an echo reduced microphone signal.

According yet further still to the first aspect of the invention, the echo cancellation system may further comprise a further adder, responsive to the echo reduced microphone signal and to a further estimate echo signal, for providing the further echo reduced microphone signal.

Yet still further according to the first aspect of the invention, the residual echo filter, the echo canceller and the residual echo suppressor may operate in a time domain, and said first, second and third control signals are provided then in the time domain as well. Further, the residual echo filter, the echo canceller and the residual echo suppressor may operate in a frequency domain, and said first and second control signals are provided then in the frequency domain as well.

Still yet further according to the first aspect of the invention, the residual echo filter and the echo canceller may operate in a time domain, and said first and third control signals are then provided in the time domain as well. Further, the residual echo suppressor may operate in a frequency domain, and said second control signal is provided then in the frequency domain as well.

According to a second aspect of the present invention, a method for acoustic echo control, comprising the steps of: providing an echo signal which is a component of a microphone signal of a microphone which is responsive to an echo signal from a loudspeaker that provides an acoustic output signal in response to a voice signal; and providing a first control signal to an echo canceller, a second control signal to a residual echo suppressor and a third control signal to a residual echo filter by a control block means which is responsive to the speech signal, to an echo reduced microphone signal and to a further echo reduced microphone signal for optimizing cancellation of the echo signal.

According further to the second aspect of the invention, the first control signal may be a transfer function signal provided to the echo canceller, said transfer function signal weights the voice signal.

Further according to the second aspect of the invention, the second control signal may be a further transfer function signal provided to the residual echo suppressor, said further transfer function signal weights an echo reduced microphone signal.

Still further according to the second aspect of the invention, the third control signal may be a residual transfer function signal provided to the residual echo filter, said residual transfer function signal weights the voice signal.

According further to the second aspect of the invention, wherein prior to the step of providing the first, the second and the third control signals, the method may further comprise the step of: determining the first, the second and the third control signals by a statistical adaptive-filter controller.

According still further to the second aspect of the invention, the method may further comprise the steps of: providing an estimate echo signal by the echo canceller using the first control signal provided by the controlled block means; and providing the echo reduced microphone signal by an adder by adding the estimate echo signal to the microphone signal. Further, the method may further comprise the steps of: providing a further estimate echo signal by the residual echo filter using the third control signal provided by the controlled block means; and providing a further echo reduced microphone signal by an adder by adding a further estimate echo signal to a microphone signal. Still further, the method may further comprise the steps of: providing an output system signal by the residual echo suppressor using the second control signal provided by the control block means.

BRIEF DESCRIPTION OF THE DRAWINGS

For a fuller understanding of the nature and objects of the present invention, reference is made to the following detailed description taken in conjunction with the following drawings, in which.

BEST MODE FOR CARRYING OUT THE INVENTION

Figure 1:
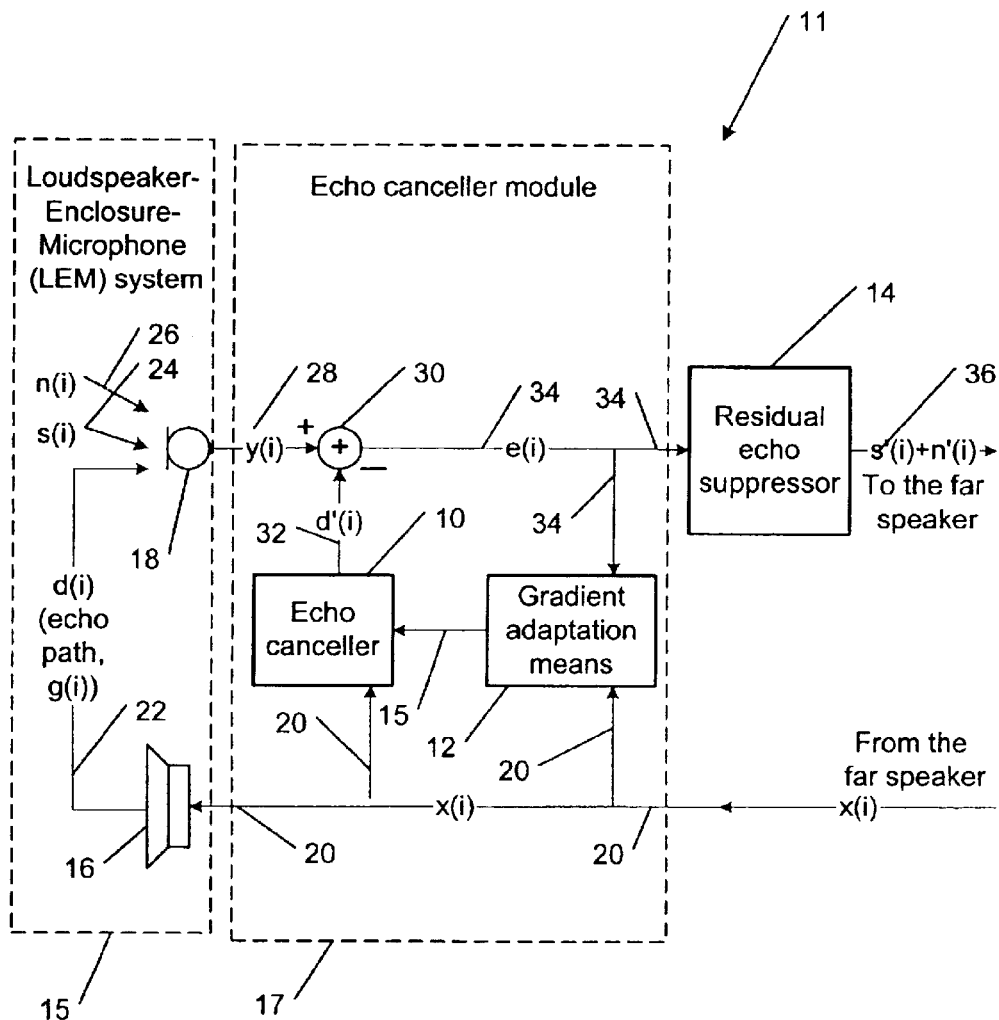
FIG. 1 is a block diagram representing a system for acoustic echo cancellation.

This invention generally relates to a digital Acoustic Echo Control (AEC) in telephones. It discloses an additional adaptive filter referred to as a residual echo filter, which is placed after the usual echo canceller module 21 of FIG. 1, and its use to efficiently and accurately estimate the residual echo signal b(i) and the system coupling factor:

$$\beta(i)=E\{\|g(i)-c(i)\|^2\},$$

which can be utilized to establish an efficient control for the AEC system and construct the appropriate filters (bold font in the equation is used for vectors). This invention also describes a control block means performing a joint operation control of the echo canceller, residual echo suppressor and residual echo filter for achieving more consistent echo cancellation results and enhancing output signal quality. This is illustrated in FIG. 2.

Figure 2:
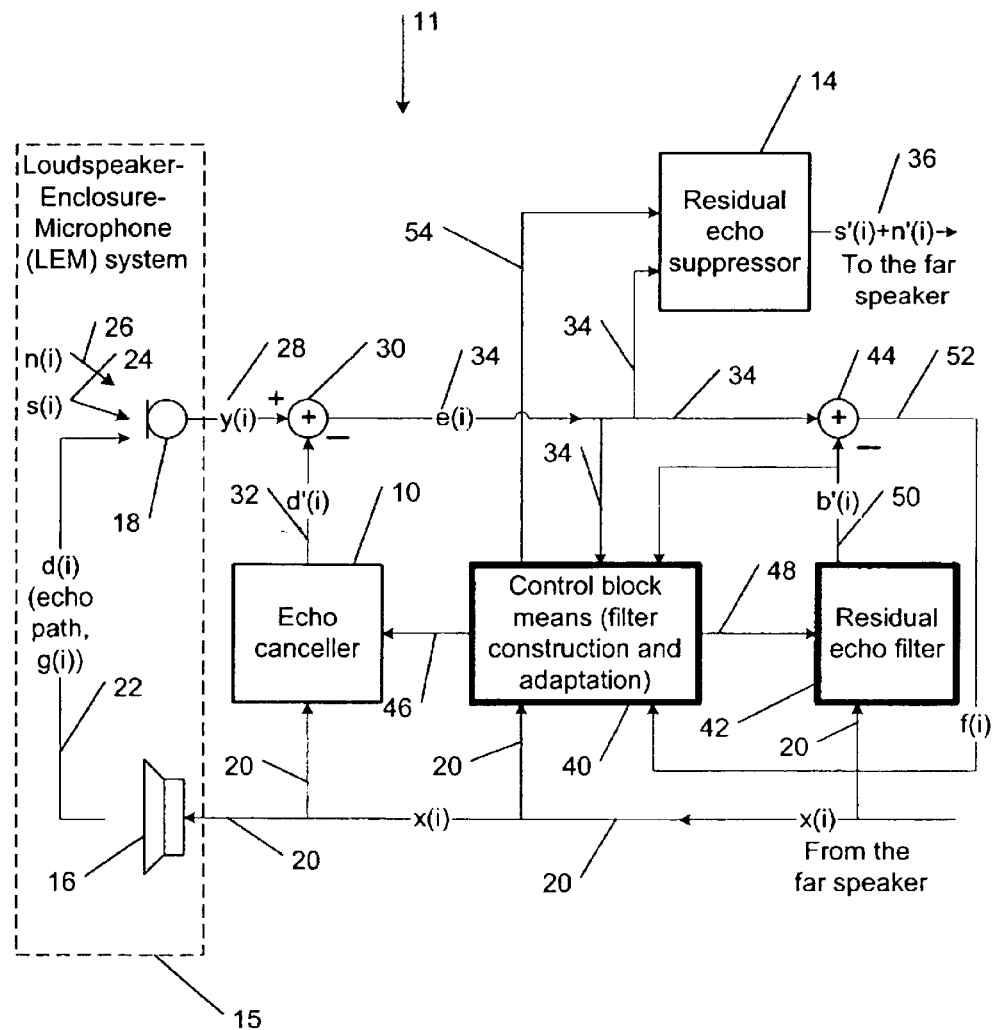
FIG. 2 is a block diagram representing a system for acoustic echo cancellation using a residual echo filter and a control block means, according to the present invention.

FIG. 2 shows a block diagram representing a system for acoustic echo cancellation 11 using a residual echo filter 42 and a control block means (CBM) 40, according to the present invention. The CBM 40 is basically a link between an echo canceller 10, a residual echo suppressor 14 and a residual echo filter 42, and provides a joint operation of these blocks. According to the present invention, the CBM 40 has a broad interpretation and incorporates all individual control means supporting operation of the blocks 10, 14, and 42. For example, the CBM 40 includes the gradient adaptation means 12 of FIG. 1.

The blocks 10 and 14 are described above in regard to FIG. 1. As shown in FIG. 2, the CBM 40 provides a first control signal 46 to the echo canceller 10, a second control signal 54 to the residual echo suppressor 14 and a third control signal 48 to the residual echo filter 42 to perform fast and robust adaptation even in the presence of a noise n(i). The CBM 40, according to the present invention, is obtained from a statistical optimization process and is therefore, extremely simple and robust. As shown in FIG. 2, the CBM 40 uses a voice signal x(i) 20, an echo reduced microphone signal e(i) 34, a further echo reduced microphone signal f(i) 52, and optionally a further estimate echo signal b'(i) 50, as input parameters.

The first control signal 46 can be a transfer function signal provided to an echo canceller 10, said transfer function signal weights the voice signal 20. If the transfer function signal 46 is in a time domain, it is an impulse function c(i) (defined in regard to FIG. 1) of the echo canceller 10. As in FIG. 1, the echo canceller 10 generates an estimate echo signal d'(i) 32 which is negatively added to the microphone signal y(i) 18 by an adder 30 which generates the echo reduced microphone signal e(i) 34 with the partially compensated echo signal. The echo reduced microphone signal e(i) 34 is further provided to the CBM 40, to the residual echo suppressor 14, and to a further adder 44.

The second control signal 54 can be a further transfer function signal of the residual echo suppressor 14, said further transfer function signal weights an echo reduced microphone signal 34 for generating a high quality undistorted microphone signal 36.

The third control signal 48 can be a residual transfer function signal provided to the residual echo filter 42, said residual transfer function signal weights the voice signal 20. If the transfer function signal 48 is in the time domain, it is an impulse function h(i) of the residual echo filter 42. The residual echo filter 42 generates a further estimate echo signal b'(i) 50 which is negatively added to the echo reduced microphone signal e(i) 34 by an adder 44 which generates the further echo reduced microphone signal f(i) 52 with the further partially compensated echo signal. The further echo reduced microphone signal f(i) 52 is further provided to the CBM 40.

The echo cancellation system 11 can operate in a time domain or in a frequency domain. This implies that the echo canceller 10, the residual echo filter 42 and the residual echo suppressor 14 can operate in the time or frequency domain, and the first and second control signals can also be provided in the time or frequency domain, respectively. Other variations are possible. For example, the echo canceller 10 and the residual echo filter 42 with corresponding the first and third control signals 46, 54, respectively, can be implemented in the time domain and the residual echo suppressor 14 with the third control signal 48 being implemented in the frequency domain.

To further illustrate the performance of the system 11 of FIG. 2, calculation of the system parameters described above is provided below for the case when the echo canceller 10 and the residual echo filter 42 with corresponding the first and the third control signals 46, 54, respectively, are implemented in the time domain and the residual echo suppressor 14 with the third control signal 48 are implemented in the frequency domain, such as a Discrete Fourier Transform (DFT) domain.

The echo canceller 10 in FIG. 2 can be implemented using a normalized least-mean-square (NLMS) algorithm as (bold font in the equation is used for vectors):

$$e(i)=y(i)-c^T(i)\times(i), \quad (1)$$

$$c(i+1) = c(i) + \mu_1(i)\frac{x(i)e(i)}{\|x(i)\|^2}, \quad (2)$$

wherein c(i) is a transfer function signal in the time domain provided to the echo canceller 10 by the CBM 40 as the first control signal 46, the $\mu_1(k)$ is a step-size determined as an estimation of the optimal step-size criteria, $$\mu(i) = \frac{E\{b^2(i)\}}{E\{e^2(i)\}}, \quad (3)$$

as follows:

$$\mu_1(i) = \frac{\beta_1(i)\overline{x^2(i)}}{\overline{e^2(i)}}, \quad (4)$$

wherein:

$$\overline{x^2(i+1)}=(1-\gamma)x^2(i)+\gamma\overline{x^2(i)} \text{ and} \quad (5)$$

$$\overline{e^2(i+1)}=(1-\gamma)e^2(i)+\gamma\overline{e^2(i)}, 0<\gamma<1, \quad (6)$$

wherein $\overline{x^2(i)}$ is a voice signal power, $\overline{e^2(i)}$ is an echo reduced microphone signal power, and $0<\gamma<1$ is a smoothing coefficient. The coupling factor, $\beta_1(i)=E\{\|g(i)-c(i)\|^2\}$, is estimated with the help of a residual transfer function signal h(i), the third control signal, 48 provided to the residual echo filter 42. Before showing how, some characteristics of the system mismatch vector, $$\Delta(i)=g(i)-c(i), \quad (7)$$

are described. One of the well-known characteristics of the NLMS filter is its tendency to disperse the estimation error energy evenly among its filter coefficients. Furthermore, the errors in each coefficient can be assumed only weakly correlated. As a result, the system mismatch or error vector has a random noise like characteristic, which corresponds to a flat magnitude squared transfer function in the frequency domain.

The residual echo filter attached to the AEC system as illustrated in FIG. 2 tries to adapt to the system constructed by the loudspeaker-enclosure-microphone (LEM) system and the adaptive echo cancellation filter, i.e., to the system mismatch vector:

$$h(i)\approx\Delta(i)=g(i)-c(i). \quad (8)$$

Thus, the coupling factor can be estimated from the residual echo filter coefficients. Furthermore, the fact that the error energy is evenly distributed among the mismatch vector makes it possible to utilize shorter filter lengths for the residual echo filter 42 than the main filter (echo canceller 10). The coupling factor estimation can then be interpolated to represent the main filter as follows:

$$\beta_1(i) = E\{\|g(i) - c(i)\|^2\} \approx \frac{N}{L} \overline{h^T(i)h(i)} = \frac{N}{L} \sum_{k=0}^{L-1} \overline{h^2(i-k)}, \quad (9)$$

wherein N is an echo canceller 10 filter length, and L is a residual echo filter 42 length with N>L. The expectation operation is inherently estimated as an averaging by the residual echo filter 42.

The residual echo filter shown in FIG. 2 can be implemented, as well, as an NLMS filter described by $$f(i) = e(i) - h^T(i) \times (i), \quad (10)$$

$$h(i+1) = h(i) + \mu_2(i) \frac{x(i)f(i)}{\|x(i)\|^2}, \quad (11)$$

wherein h(i) is a residual transfer function signal in the time domain, the third control signal 48 provided to the residual echo filter 42. The further step-size, $\mu_2(i)$, for the residual echo filter is also estimated according to the optimal rule described by Equation 4, as follows:

$$\mu_2(i) = \frac{\beta_2 \overline{x^2(i)}}{\overline{f^2(i)}}, \quad (12)$$

wherein $\overline{f^2(i)}$ is a further echo reduced microphone signal power.

The difference is that a further coupling factor, $0<\beta_2<1$, is a constant. As a result, the filter does not adapt optimally, that, in turn, degrades the residual echo estimation performance. However, the estimate does not have to be accurate in order to provide an already very good overall echo cancellation performance. Moreover, the estimate accuracy can be enhanced by utilizing knowledge about the system mismatch.

Realization of the $\beta_1$ estimator is described below. The case $\beta_2 > \beta_1(i)$ can be achieved by choosing, for example, $\beta_2 = 0.1 \ldots 1.0$. The system coupling factor, $\beta_1(i)$, is usually smaller than this value, motivated by the physical nature of an acoustic echo path which is not performing power amplification. If $\beta_2 > \beta_1(i)$, the residual echo filter delivers an estimate of the time varying residual echo path h(i) quickly, but momentarily inaccurate. As a consequence, the corresponding system coupling factor estimate, $\beta_1(i)$, also becomes unreliable and biased. Thus, a bias correction (derived from the statistics of LMS type adaptive filters) can be applied to $\beta_1(i)$.

In this way, an unbiased estimate of $\beta_1(i)$ can be determined quickly and reliably at the same time. The corresponding echo canceller e(i) thus tracks room impulse response changes quickly but also delivers accurate estimates in the "steady state". The corresponding postfilter (the residual echo suppressor 14 of FIG. 2) for residual echo suppression relies on the quality of $\beta_1(i)$ as well.

The residual echo suppression filter 14 can be constructed, e.g., according to Wiener rule in the frequency domain, implemented as the Discrete Fourier Transform (DFT) domain, as follows:

$$W(\Omega, k) = \frac{\Phi_E(\Omega, k) - \Phi_B(\Omega, k)}{\Phi_E(\Omega, k)}, \quad (13)$$

wherein $W(\Omega,k)$ is a further transfer function signal, the second control signal 54, provided to the residual echo suppressor 14 in the form of the DFT and, $\Phi_E(\Omega,k)$ and $\Phi_B(\Omega,k)$ are power spectral density (PSD) signals of the echo reduced microphone signal e(i) 34 and a residual echo signal b(i)=d(i)−d'(i) (a difference between an echo signal d(i) and an estimate echo signal d'(i) 32) with frequency and frame indexes $\Omega$ and k, respectively. The residual echo PSD can be estimated with the help of the coupling factor described by Equation 9 as follows:

$$\Phi_B(\Omega,k) = \beta_1(k)\Phi_X(\Omega,k), \quad (14)$$

wherein $\beta_1(k) = \beta_1(i)$ is the coupling factor estimated at the time corresponding to the end of a frame. Since the residual echo filter has a flat magnitude squared transfer function in the frequency domain, its effect on the excitation signal, x(i), in the frequency domain can be modeled only with the level change. Thus, the frequency independent coupling factor $\beta_1(k)$ can be directly utilized.

The residual echo filter 42 outputs a further estimate echo signal b'(i). This output can be optionally used to estimate directly the estimate echo signal power, e.g., with a first order recursive smoothing equation:

$$\overline{b'^2(i)} \approx (1-\gamma)b'^2(i) + \gamma \overline{b'^2(i-1)}, \quad (15)$$

wherein $\overline{b'^2(i)}$ is a further estimate echo signal power of a further estimate echo signal b'(i) 50 and $0<\gamma<1$ is a smoothing coefficient. The result can be directly used in Equation 3. However, the residual echo power estimation through the coupling factor using Equation 4 is preferred, since it is easier to handle, according to the present invention.

Equations 9–12 and 14 are novel and original and constitute a new methodology for enhancing the acoustic echo cancellation system using residual echo filter, according to the present invention.

Figure 3:
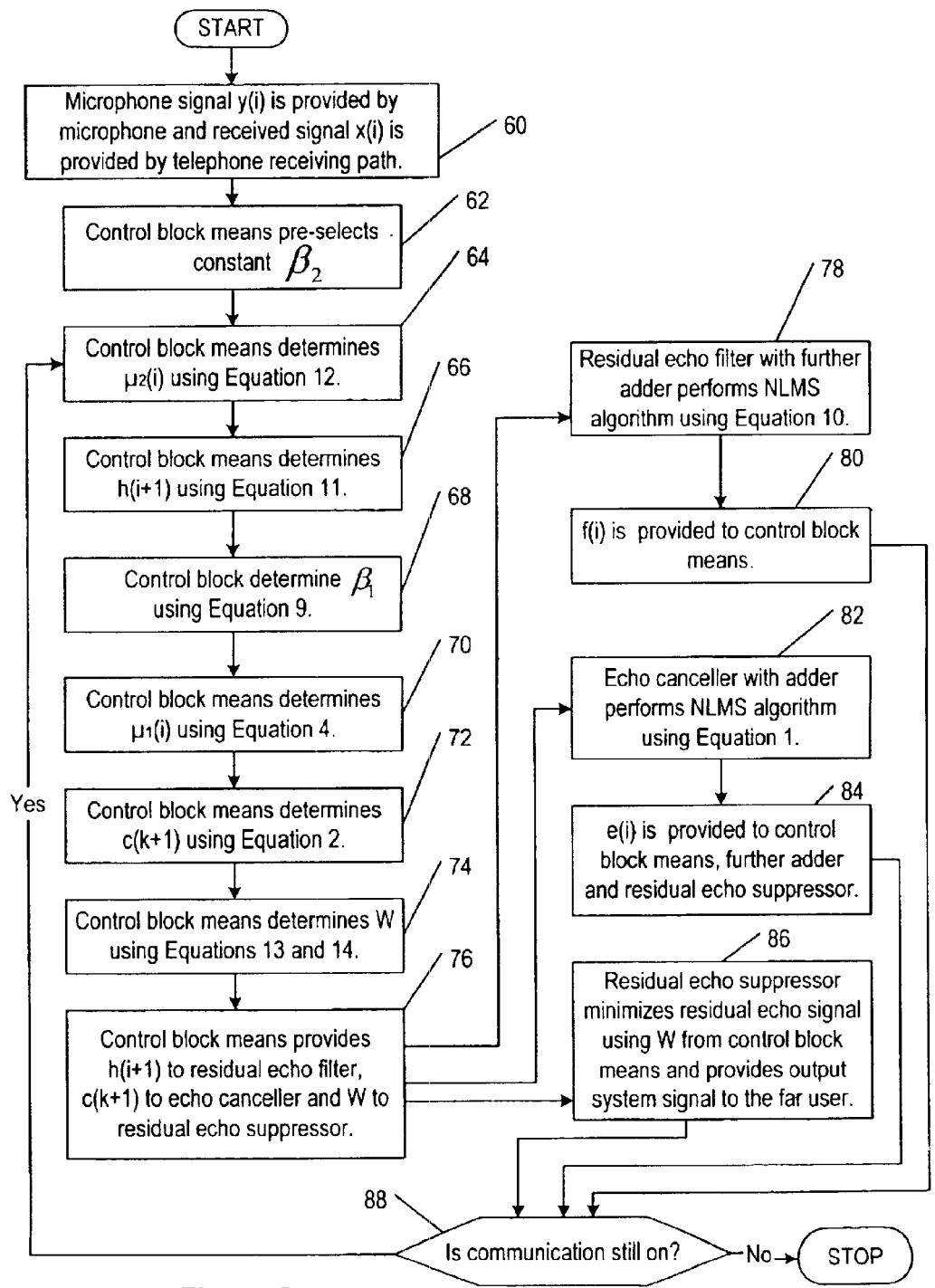
FIG. 3 is a flow chart illustrating the performance of a system of FIG. 2 for an echo canceller time domain, residual echo filter time domain and residual echo suppressor frequency domain operation, according to the present invention.

FIG. 3 is a flow chart illustrating a performance of a system of FIG. 2 for an echo canceller and residual echo filter time domain and residual echo suppressor frequency domain operation, using the algorithm described above. In a method according to the present invention, in a first step 60, a microphone signal y(i) 28, a part of which is the echo signal d(i) 22, is provided by the microphone 18 and the voice signal x(i) 20 is provided by a telephone receiving path. Said echo signal is a microphone response to an acoustic output signal provided by a loudspeaker 16 in response to the voice signal x(i) 20. In a next step 62, the coupling factor constant $\beta_2$ is pre-selected by the CBM 40. In a next step 64, CBM 40 determines the further step-size $\mu_2(i)$ using Equation 12. In a next step 66, the CBM 40 determines the residual transfer function signal h(i+1), the third control signal 48, using Equation 11. In a next step 68, the CBM 40 determines the coupling factor $\beta_1(i)$ using Equation 9. In a next step 70, the CBM 40 determines the step-size $\mu_1(i)$ using Equation 4. In a next step 72, the CBM 40 determines the transfer function signal c(k+1), the first control signal 46, using Equation 2. In a next step 74, the CBM 40 determines the further transfer function signal $W(\Omega,k)$, the third control signal 54, using Equations 13 and (14). In a next step 76, the CBM 40 provides the third control signal h(i+1) 48 to the residual echo filter 42, the first control signal c(k+1) 46 to the echo canceller 10 and the second control signal $W(\Omega,k)$ 54 to the residual echo suppressor 14. After the step 76, the process continues to steps 78, 82 and 86 which initiate three procedures taking place in parallel.

In a step 78, the residual echo filter 42 with adder 44 performs NLMS algorithm using Equation 10. In a next step 80, the further echo reduced microphone signal f(i) 52 is provided to the CBM 40.

In a step 82, the echo canceller 10 with adder 30 perform NLMS algorithm using Equation 1. In a next step 84, the echo reduced microphone signal e(i) 34 is provided to the CBM 40, to the adder 30 and to the residual echo suppressor 14.

In a next step 86, the residual echo suppressor 14 minimizes the residual echo component of the echo reduced microphone signal 34 using the further transfer function signal W(Ω,k), the third control signal 54, which weights the echo reduced microphone signal 34 in the frequency domain for generating a high quality undistorted microphone signal 36 and for providing the signal 36 to the far user.

After steps 80, 84 and 86, in a next step 88, a determination is made whether communication (e.g., phone conversation) is still on. If not, the process stops. If communication is still on, the process returns to step 64.

What is claimed is:

1. An echo cancellation system (11), comprising:
   a microphone (18), responsive to a resulting echo signal (22) from a loudspeaker (16) that provides an acoustic output in response to a speech signal (20), for providing an echo signal which is a component of a microphone signal (28); and
   a control block means (40), responsive to the speech signal (20), to an echo reduced microphone signal (34) and to a further echo reduced microphone signal (52), for providing a first control signal (46) to an echo canceller (10), a second control signal (54) to a residual echo suppressor (14) and a third control signal (48) to a residual echo filter (42); wherein said control signals are provided for optimizing cancellation of the echo signal.

2. The echo cancellation system (11) of claim 1, wherein the first control signal (46) is a transfer function signal provided to the echo canceller (10), said transfer function signal weights the voice signal (20).

3. The echo cancellation system (11) of claim 1, wherein the second control signal (54) is a further transfer function signal provided to the residual echo suppressor (14), said further transfer function signal weights an echo reduced microphone signal (34).

4. The echo cancellation system (11) of claim 1, wherein the third control signal (48) is a residual transfer function signal provided to the residual echo filter (42), said residual transfer function signal weights the voice signal (20).

5. The echo cancellation system (11) of claim 1, further comprising the residual echo filter (42), responsive to the speech signal (20) and to the third control signal (48), for providing a further estimate echo signal (50) to a further adder (44).

6. The echo cancellation system (11) of claim 1, further comprising the residual echo suppressor (14), responsive to an echo reduced microphone signal (34) and to the second control signal (54), for providing an output system signal (36).

7. The echo cancellation system (11) of claim 1, further comprising the echo canceller (10), responsive to the voice signal (20) and to the first control signal (42), for providing an estimate echo signal (32) to an adder (30).

8. The echo cancellation system (11) of claim 7, further comprising the residual echo filter (42), responsive to the speech signal (20) and to the third control signal (48), for providing a further estimate echo signal (50) to a further adder (44).

9. The echo cancellation system (11) of claim 8, further comprising the residual echo suppressor (14), responsive to the echo reduced microphone signal (34) and to the second control signal (54), for providing an output system signal (36).

10. The echo cancellation system (11) of claim 1, further comprising an adder (18), responsive to a microphone signal (28) and to an estimate echo signal (32), for providing an echo reduced microphone signal (34).

11. The echo cancellation system (11) of claim 1, further comprising a further adder (44), responsive to the echo reduced microphone signal (34) and to a further estimate echo signal (50), for providing the further echo reduced microphone signal (52).

12. The echo cancellation system (11) of claim 1, wherein the residual echo filter (42), the echo canceller (10) and the residual echo suppressor (14) operate in a time domain, and said first, second and third control signals (46, 54, 48) are provided in the time domain as well.

13. The echo cancellation system (11) of claim 1, wherein the residual echo filter (42), the echo canceller (10) and the residual echo suppressor (14) operate in a frequency domain, and said first and second control signals (46, 54) are provided in the frequency domain as well.

14. The echo cancellation system (11) of claim 1, wherein the residual echo filter (42) and the echo canceller (10) operate in a time domain, and said first and third control signals (46, 48) are provided in the time domain as well.

15. The echo cancellation system (11) of claim 14, wherein the residual echo suppressor (14) operates in a frequency domain, and said second control signal (54) is provided in the frequency domain as well.

16. The echo cancellation system (11) of claim 14, wherein the first and the third control signals (46, 48) are determined, respectively, as $$c(i+1) = c(i) + \mu_1(i)\frac{x(i)e(i)}{\|x(i)\|^2} \text{ and}$$

$$h(i+1) = h(i) + \mu_2(i)\frac{x(i)f(i)}{\|x(i)\|^2},$$

wherein c(i) is a transfer function signal in the time domain provided to the echo canceller (10), h(i) is a residual transfer function signal in the time domain provided to the residual echo filter (42), $\mu_1$(k) and $\mu_2$(k) are a step-size signal and a further step-size signal, respectively, x(i) is a voice signal (20), e(i)=y(i)−$c^T$(i)×(i) is the echo reduced microphone signal (34), and f(i)=e(i)−$h^T$(i)×(i) is the further echo reduced microphone signal (52), where y(i) is the microphone signal (28).

17. The echo cancellation system (11) of claim 16, wherein the step-size signal and the further step-size signal, are determined, respectively, as $$\mu_1(i) = \frac{\beta_1(i)\overline{x^2(i)}}{\overline{e^2(i)}} \text{ and}$$

$$\mu_2(i) = \frac{\beta_2\overline{x^2(i)}}{\overline{f^2(i)}},$$

wherein $\beta_2$ is a pre-selected constant, $\overline{x^2(i)}$ is a voice signal power, $\overline{f^2(i)}$ is a further echo reduced microphone signal power, $\overline{e^2(i)}$ is an echo reduced microphone signal power, and a coupling factor $\beta_1(i)$ is determined as $$\beta_1(i) = \frac{N}{L} h^T(i)h(i) = \frac{N}{L} \sum_{k=0}^{L-1} h^2(i-k),$$

wherein N is an echo canceller (10) filter length, and L is a residual echo filter (42) length.

18. The echo cancellation system (11) of claim 17, wherein $\overline{x^2(i)}$ and $\overline{e^2(i)}$, are determined, respectively, from equations $$\overline{x^2(i+1)} = (1-\gamma)\overline{x^2(i)} + \gamma\overline{x^2(i)} \text{ and} \quad (5)$$

$$\overline{e^2(i+1)} = (1-\gamma)\overline{e^2(i)} + \gamma\overline{e^2(i)}, \, 0 < \gamma < 1,$$

wherein $0 < \gamma < 1$ is a smoothing coefficient.

19. The echo cancellation system (11) of claim 17, wherein the step-size signal is determined as $$\mu_1(i) = \frac{\overline{b'^2(i)}}{\overline{e^2(i)}}$$

wherein $\overline{b'^2(i)} = (1-\gamma)b'^2(i) + \gamma\overline{b'^2(i-1)}$ is a further estimate echo signal power of a further estimate echo signal b'(i) (50), wherein $0 < \gamma < 1$ is a smoothing coefficient and b'(i) (50) is provided to the control block means (40).

20. The echo cancellation system (11) of claim 17, wherein the residual echo suppressor (14) operates in a frequency domain implemented as a Discrete Fourier Transform (DFT) domain and the second control signal (54) is determined in the frequency domain, implemented as the Discrete Fourier Transform (DFT) domain, as follows:

$$W(\Omega, k) = \frac{\Phi_E(\Omega, k) - \Phi_B(\Omega, k)}{\Phi_E(\Omega, k)},$$

wherein $W(\Omega,k)$ is a further transfer function signal provided to a residual echo suppressor (14) in the form of the DFT and, $\Phi_E(\Omega,k)$ and $\Phi_B(\Omega,k)$ are power spectral density (PSD) signals of the echo reduced microphone signal e(i) (34) and b(i)=d(i)−d'(i) is a residual echo signal equals to a difference between an echo signal d(i) and an estimate echo signal d'(i) (32) with frequency and frame indexes $\Omega$ and k, respectively; wherein the $\Phi_B(\Omega,k)$ is determined as $$\Phi_B(\Omega,k) = \beta_1(k)\Phi_X(\Omega,k),$$

where $\beta_1(k) = \beta_1(i)$ is the coupling factor estimated at a time corresponding to the end of a frame.

21. A method for acoustic echo control, comprising the steps of:
providing (60) an echo signal which is a component of a microphone signal (28) of a microphone (18) which is responsive to an echo signal (22) from a loudspeaker (16) that provides an acoustic output signal in response to a voice signal (20); and
providing (76) a first control signal (46) to an echo canceller (10), a second control signal (54) to a residual echo suppressor (14) and a third control signal (48) to a residual echo filter (42) by a control block means (40) which is responsive to the speech signal (20), to an echo reduced microphone signal (34) and to a further echo reduced microphone signal (52) for optimizing cancellation of the echo signal.

22. The method of claim 21, wherein the first control signal (46) is a transfer function signal provided to the echo canceller (10), said transfer function signal weights the voice signal (20).

23. The method of claim 21, wherein the second control signal (54) is a further transfer function signal provided to the residual echo suppressor (14), said further transfer function signal weights an echo reduced microphone signal (34).

24. The method of claim 21, wherein the third control signal (48) is a residual transfer function signal provided to the residual echo filter (42), said residual transfer function signal weights the voice signal (20).

25. The method of claim 21, prior to the step of providing (108) the first, the second and the third control signals (46, 54, 48), further comprising the step of:
determining (72, 74, 66) the first, the second and the third control signals (46, 54, 48) by a statistical adaptive-filter controller (40).

26. The method of claim 21, further comprising the steps of:
providing (82) an estimate echo signal (32) by the echo canceller (10) using the first control signal (46) provided by the controlled block means (40); and
providing (84) the echo reduced microphone signal (34) by an adder (28) by adding the estimate echo signal (32) to the microphone signal (18).

27. The method of claim 26, further comprising the steps of:
providing (82) a further estimate echo signal (52) by the residual echo filter (42) using the third control signal (48) provided by the controlled block means (40); and
providing (84) a further echo reduced microphone signal (52) by an adder (50) by adding a further estimate echo signal (50) to a microphone signal (18).

28. The method of claim 27, further comprising the steps of:
providing (86) an output system signal (36) by the residual echo suppressor (14) using the second control signal (54) provided by the control block means (40).

* * * * *